(12) United States Patent
Roggenkamp et al.

(10) Patent No.: US 8,167,272 B2
(45) Date of Patent: May 1, 2012

(54) LUBRICATING SYSTEMS, LUBRICANT ATOMIZING DEVICES AND METHODS OF USING THE SAME

(75) Inventors: William Phillip Roggenkamp, Georgetown, KY (US); George Parker Castlen, Lexington, KY (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 501 days.

(21) Appl. No.: 12/500,118

(22) Filed: Jul. 9, 2009

(65) Prior Publication Data

US 2011/0006274 A1   Jan. 13, 2011

(51) Int. Cl.
*B63B 35/03* (2006.01)

(52) U.S. Cl. ..... 254/134.3 R; 254/134.3 FT; 254/134.4; 254/134.3 SC

(58) Field of Classification Search ........... 254/134.3 R, 254/134.3 FT, 134.4, 134.3 SC, 134.5, 134.3 PA, 254/134.3 CL, 134; 118/306, 317, DIG. 10
See application file for complete search history.

(56) References Cited

U.S. PATENT DOCUMENTS

| | | | |
|---|---|---|---|
| 3,031,068 A | 4/1962 | Ware | |
| 3,565,213 A * | 2/1971 | Heller | 184/15.2 |
| 3,783,972 A * | 1/1974 | Molstad | 184/15.1 |
| 4,063,617 A * | 12/1977 | Shenk | 184/15.1 |
| 4,185,809 A * | 1/1980 | Jonnes | 254/134.4 |
| 4,296,837 A | 10/1981 | Charlton | |
| 4,324,315 A * | 4/1982 | Charlton | 184/15.1 |
| 4,554,998 A | 11/1985 | Kenny | |
| 4,573,715 A | 3/1986 | Armbruster | |
| 4,749,059 A * | 6/1988 | Jonnes et al. | 184/15.1 |
| 5,207,292 A * | 5/1993 | Pecot et al. | 184/15.1 |
| 5,400,427 A * | 3/1995 | Ashjian et al. | 385/102 |
| 5,407,379 A * | 4/1995 | Shank et al. | 451/99 |
| 5,560,655 A * | 10/1996 | Cameron | 285/39 |
| 5,632,356 A * | 5/1997 | Sells | 184/15.2 |
| 5,645,267 A * | 7/1997 | Reeve et al. | 254/134.4 |
| 5,654,526 A * | 8/1997 | Sharp | 174/84 R |
| 6,145,624 A | 11/2000 | Tharpe | |
| 6,270,288 B1 * | 8/2001 | Weidenheft et al. | 405/158 |
| 6,572,081 B2 * | 6/2003 | Griffioen et al. | 254/134.4 |
| 6,614,962 B1 * | 9/2003 | Serrander et al. | 385/45 |
| 2005/0067608 A1 * | 3/2005 | Griffioen et al. | 254/134.4 |

* cited by examiner

*Primary Examiner* — George Nguyen
(74) *Attorney, Agent, or Firm* — Dinsmore & Shohl LLP

(57) ABSTRACT

A portable hand-held lubricant atomizing device includes an inlet for receiving pressurized gas from a pressurized gas source. A flow control mechanism is associated with the inlet for controlling delivery of the pressurized gas. A lubricant tank includes a wire pulling lubricant. An atomizing chamber is provided in where a lubricant spray is produced using the wire pulling lubricant and pressurized gas. An outlet downstream of the atomizing chamber is sized to deliver the lubricant spray to an inner surface of an outer conduit.

20 Claims, 4 Drawing Sheets

LUBRICATING SYSTEMS, LUBRICANT ATOMIZING DEVICES AND METHODS OF USING THE SAME

TECHNICAL FIELD

The present specification generally relates to lubricant atomizing devices and methods of using the same and, more specifically, lubricant atomizing devices and methods for removing or inserting wire into conduit.

BACKGROUND

Electrical wire bundles including individual electrical wires may be housed within an outer conduit. The individual wires typically include one or more conductors within an individual insulating jacket. The outer conduit may be flexible or inflexible and have an inner diameter that is sized to receive the wire bundle that is larger than an individual wire, but only slightly larger, or even slightly smaller than the maximum width of the wire bundle. Such sizing of the wire bundle and outer conduit can inhibit movement of the individual wires once housed within the outer conduit.

Due to the sizing of the wire bundle and outer conduit, large friction forces may be generated when inserting the wire bundle into the outer conduit or removing one or more of the wires from the outer conduit. While lubrication may be manually applied to the wires at the entry of the outer conduit to reduce friction forces when the wire is pulled through the outer conduit, such processes are often messy and time-consuming. Accordingly, a need exists for alternative lubrication devices and methods for pulling wire through outer conduit.

SUMMARY

In one embodiment, a method of pulling electrical wire through an outer conduit is provided. The method includes providing an outer conduit having an inner diameter; providing a lubricant atomizing device including a lubricant tank and an atomizing chamber; pressurizing a wire pulling lubricant within the lubricant tank using a source of pressurized gas external of the lubricant tank; delivering the wire pulling lubricant to the atomizing chamber; forming a lubricant spray within the atomizing chamber using pressurized gas delivered to the atomizing chamber; inserting a lubricant delivery tubing into the outer conduit, the lubricant delivery tubing having an inner diameter that is less than an inner diameter of the outer conduit; applying the lubricant spray through the lubricant delivery tubing to an inner surface of the outer conduit; and pulling the electrical wire through the outer conduit.

In another embodiment, a portable hand-held lubricant atomizing device includes an inlet for receiving pressurized gas from a pressurized gas source. A flow control mechanism is associated with the inlet for controlling delivery of the pressurized gas. A lubricant tank includes a wire pulling lubricant. An atomizing chamber is provided in where a lubricant spray is produced using the wire pulling lubricant and pressurized gas. An outlet downstream of the atomizing chamber is sized to deliver the lubricant spray to an inner surface of an outer conduit.

In yet another embodiment, a lubricant system includes a wire pulling device configured to apply a pulling force to an electrical wire for pulling the electrical wire through an outer conduit. A portable hand-held lubricant atomizing device includes a lubricant tank including a wire pulling lubricant. A lubricant delivery member is provided where a lubricant spray of the wire pulling lubricant is produced. A flow control mechanism controls delivery of a pressurized gas from a pressurized gas source to both the lubricant tank and the lubricant delivery member for generating the lubricant spray.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
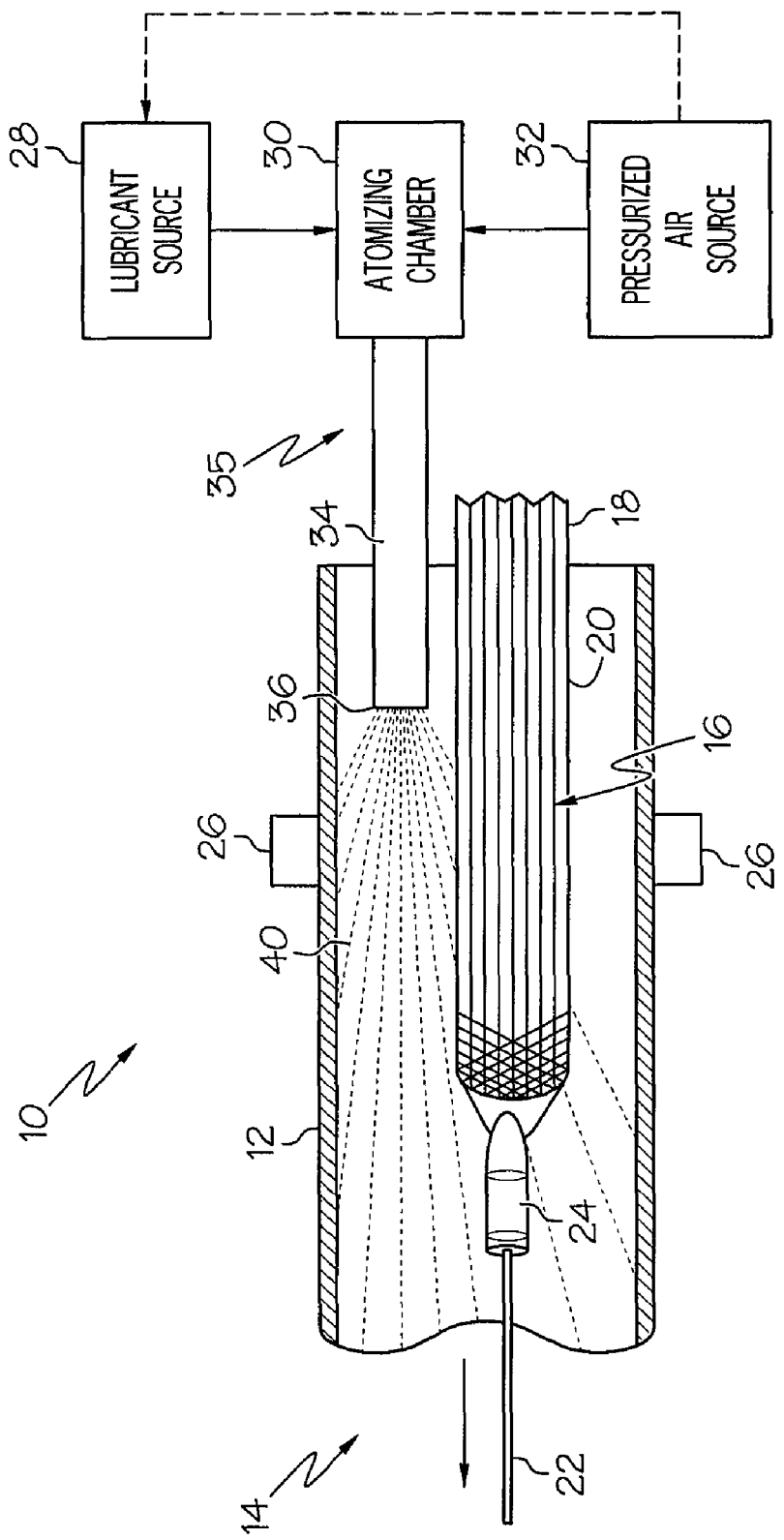
FIG. 1 is a diagrammatic view of an embodiment of a lubricating system for a wire pulling operation.

Referring to FIG. 1, an example of one embodiment of a lubricating system 10 for lubricating an outer conduit 12 is illustrated. The lubricating system 10 generally includes a wire pulling system, generally designated as element 14, and an atomizing device 35. The wire pulling system 14 is releasably connected to a wire bundle 16 formed of a number wires 18 (e.g., two or more, such as 4 or more, such as 8 or more, such as 10 or more). The system 10 also includes the lubricant atomizing device 35. Lubricating system 10 and components thereof will be described in more detail herein.

As illustrated, the wire pulling system 14 includes a pulling cable 22 connected to an end of the wire bundle 16 by a connector 24 (e.g., a clamp connector) that releasably connects to the pulling cable. While the pulling system 14 is illustrated as pulling a wire bundle 16, multiple wire bundles may be pulled or one or more individual wires 18 may be pulled. The wire pulling system 14 may include a holding system 26. The holding system 26 may be used to hold the outer conduit 12 stationary as the wire bundle 16 is pulled through the outer conduit so that the wire bundle can slide relative to the outer conduit. The wires 18 may each include a jacket 20 with one or more conductors running therethrough. Any suitable pulling system 14 may be used, for example, including a winch, a lever system, etc.

The lubricating system 10 includes a lubricant atomizing device 35 including a lubricant source 28 that is connected to and supplies lubricant to an atomizing chamber 30. A pressurized air source 32 is connected to and supplies pressurized air (or other suitable gas) to the atomizing chamber 30, which is used to atomize the lubricant supplied from the lubricant source 28. The atomized lubricant is then directed down lubricant delivery tubing 34 in its atomized form due to the pressurized air. An open end 36 of the lubricant delivery tubing 34 serves as a nozzle for directing the atomized lubricant in the form of spray 40 throughout an inner surface 38 of the outer conduit 12 and over the wire bundle 16. In the illustrated embodiment, an outer diameter of the lubricant delivery tubing 34 is less than the inner diameter of the outer conduit 12 so that the open end 36 can be inserted into the outer conduit. The outer diameter of the lubricant delivery conduit may be sized to allow maneuvering of the lubricant delivery conduit within the outer conduit, which may facilitate lubricant distribution. In some embodiments, the outer diameter of the lubricant delivery tubing 34 may be about one inch or less in outer diameter, such as about one-half inch or less and the inner diameter of the outer conduit may be one inch or more, such as about 1½ inches or more. In some embodiments, the outer diameter of the lubricant delivery tubing 34 may be about 50 percent of the inner diameter of the outer conduit 12 or less, such as about 35 percent or less, such as about 33 percent.

In some embodiments, the lubricant delivery tubing 34 may be flexible to allow for repositioning of the open end 36 of the lubricant delivery tubing relative to the rest of the lubricant atomizing device 35. Alternatively, the lubricant delivery tubing 34 may be rigid and immovable relative to the rest of the lubricant atomizing device.

Any suitable wire pulling lubricant may be used, such as a polymer based liquid wire pulling lubricant commercially available from Greenlee Textron, Inc., Rockford, Ill. An average coefficient of friction may be about 0.3 or less such as about 0.26 or less. A suitable test for determining coefficient of friction is the IEEE 375-2 test procedure testing kinetic coefficient of friction at 300 lb/ft sidewall bearing pressure. In some embodiments, the spray 40 may include individual droplets having a maximum width of about one millimeter or less. The pressurized air source 32 may deliver pressurized air at about 100 psi or more. Lubricant may be delivered to the atomizing chamber, in some embodiments, using a suitable, hand-pumped grease gun at a rate of about ⅔ cc or more per pump. In one embodiment, as represented by the dotted line 42, the pressurized air source 32 may also be used to pressurize the lubricant source 28 to supply the lubricant to the atomizing chamber 30. Alternatively, the lubricant source 28 may be pressurized (e.g., using a pump) to deliver lubricant to the atomizing chamber 30.

The lubricant atomizing device 35 and wire pulling system 14 may be used to lubricate and pull the wire bundle 16 through a straight outer conduit or a bent outer conduit having one or more bends, offsets, etc. Cable pulling may be accomplished manually, using a lever, winch, a motorized puller, etc. In some embodiments, a motorized puller may have between about 2000 lbs and 8000 lbs of pull force, capable of pulling between about 6 fpm and 35 fpm, depending on the load. Various accessories may be provided, such as force gauges, floor or wall mounts, storage trays, sheaves, etc.

Figure 2:
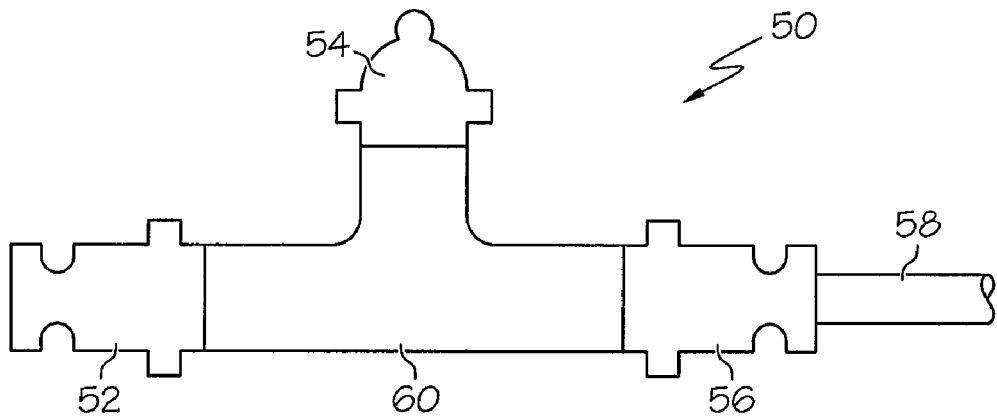
FIG. 2 is a diagrammatic view of an embodiment of a lubricant atomizing device for use in the lubricating system of FIG. 1.

FIG. 2 illustrates an embodiment of a lubricant atomizing device 50 that includes a pneumatic quick connector 52 for connecting to a pressurized air source, a grease zerk 54 for connecting to a lubricant source and a fitting 56 for connecting to a lubricant delivery tubing 58. The pneumatic quick connector 52, grease zerk 54 and fitting 56 are connected together by a T-shaped connector 60. The T-shaped connector 60 provides an atomizing chamber where pressurized air can be used to atomize the lubricant flowing through the grease zerk 54. The grease zerk 54 may include a valve such as a spring-loaded ball valve inside the grease zerk which may compress and open when pressure is applied, for example, with a grease gun and allows grease to flow through the grease zerk. After pressure is released, the valve may return to the head of the grease zerk 54 and inhibit dirt and other contaminants from entering the grease zerk as well as prevent grease from escaping through the head of the grease zerk. Various grease zerks 54 are available in different threads, lengths, angles, materials, and finishes. While a T-shaped connector 60 is shown by FIG. 2, any other suitable connector may be used such as a Y-shaped connector.

Figure 3:
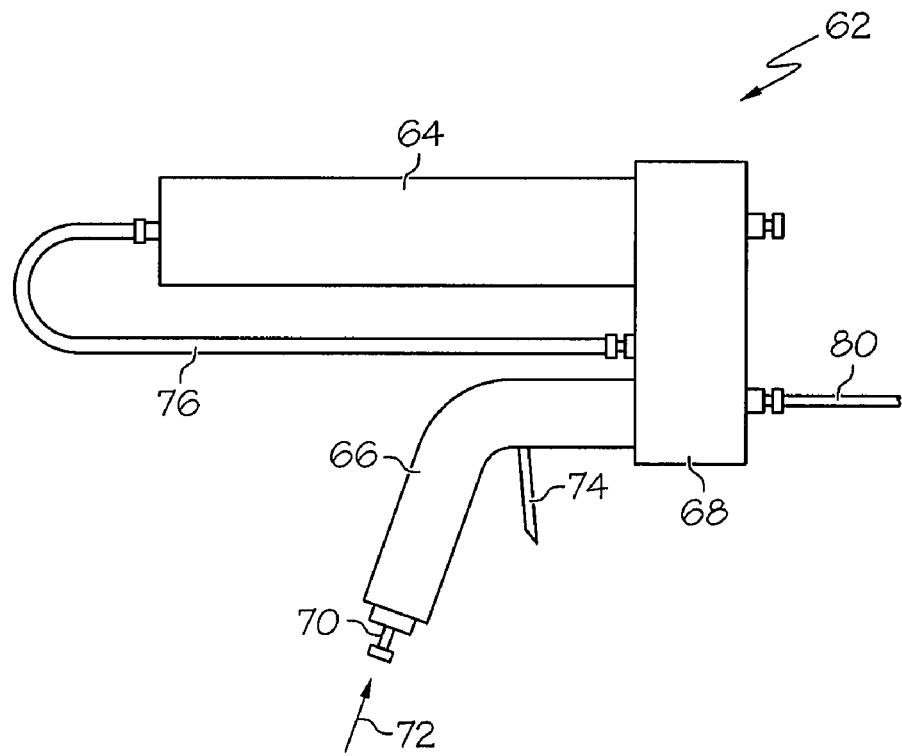
FIG. 3 is a diagrammatic view of another embodiment of a lubricant atomizing device for use in the lubricating system of FIG. 1.

Referring to FIG. 3, another embodiment of a lubricant atomizing device 62 is illustrated. The lubricant atomizing device 62 includes a lubricant tank 64 and a control mechanism 66 connected to the lubricant tank by a lubricant delivery member 68. The control mechanism 66 includes an air line connector 70 for connecting the lubricant atomizing device 62 to a pressurized air source (represented by arrow 72) and a flow control 74 (e.g., a trigger, button, etc.) for controlling delivery of pressurized air. An air line 76 connects the control mechanism 66 and pressurized air source 72 to the lubricant tank 64. Pressurized air from the pressurized air source 72 may be used to pressurize a lubricant chamber 78 (FIG. 4) of the lubricant tank 64 so that lubricant is delivered from the lubricant tank to the lubricant delivery member 68. Pressurized air from the pressurized air source 72 may also be used to atomize the lubricant within the lubricant delivery member 68 and to direct the atomized lubricant to a lubricant delivery tubing 80. The control mechanism 66 may control the rate (increase or decrease) at which pressurized air is delivered to both the lubricant tank 64 and the lubricant delivery member 68.

Figure 4:
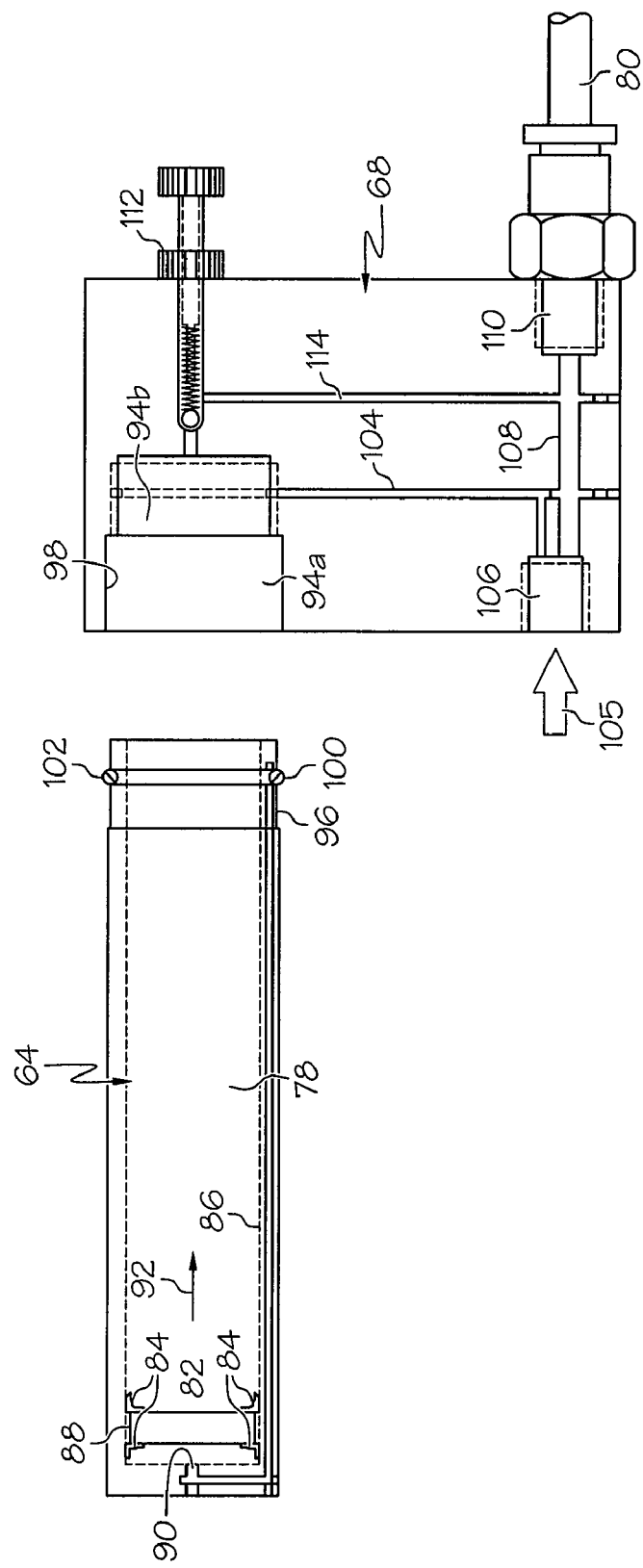
FIG. 4 are diagrammatic section views of an embodiment of a lubricant tank and a lubricant delivery member for use in the lubricant atomizing device of FIG. 3.

Referring to FIG. 4, additional details of one embodiment of the lubricant tank 64 and lubricant delivery member 68 are shown diagrammatically. The lubricant tank 64 includes the lubricant chamber 78 that extends along a length of the lubricant tank. A piston 82 may be located in the lubricant chamber 78 and may be moveable along the length of the lubricant tank. Seals 84 may be provided to inhibit lubricant from passing between an inner wall 86 of the lubricant tank 64 and a periphery 88 of the piston 82. Pressurized air may enter the lubricant chamber 78 behind the piston 82 at inlet 90 and be used to move the piston 82 in the direction of arrow 92. The pressurized air may be delivered using the control mechanism 66 as shown in FIG. 3, or the pressurized air may be delivered from a different pressurized air source. In some embodiments, the lubricant tank 64 may itself be pressurized.

In embodiments utilizing piston 82, movement of the piston in the direction of arrow 92 may cause lubricant to be directed into chamber 94b within the lubricant delivery member 68. In some embodiments, the lubricant tank 64 may be connected within chamber 94a of the lubricant delivery member 68. As one example, the lubricant tank 64 may include a threaded outer surface 96 that mates with a threaded inner surface 98 of the chamber 94a. A seal 100 (e.g., an o-ring) may be located in a recessed portion 102 of the lubricant tank 64 to inhibit lubricant from passing between the outer surface 96 and inner surface 98.

Lubricant entering the chamber 94b may be directed along passageway 104 under the influence of the piston 82 and the pressurized air to an air introduction chamber 106. Pressurized air may be introduced to the air introduction chamber 106 from the control mechanism 66 as represented by arrow 105 where the air and lubricant mix. In some embodiments, the flow control 74 may control an amount of air entering the air introduction chamber 106.

Air and lubricant are then directed through passageway 108, which may serve as a flow restriction thereby accelerating the air and lubricant travel along the passageway 108. The air and lubricant mixture enters an expansion chamber 110 having a volume that is larger than that of the passageway 108. Expansion of the air and lubricant generates lubricant spray particles and can prevent lubricant particles from commingling together and forming larger particles. The lubricant spray is then directed through the lubricant delivery tubing 80.

A flow control and check valve 112 may be provided. The flow control and check valve 112 may open when pressure within the lubricant tank 64 exceeds a pre-selected value. The flow control and check valve 112 may allow additional lubricant to flow through passageway 114 when the flow control and check valve opens.

Figure 5:
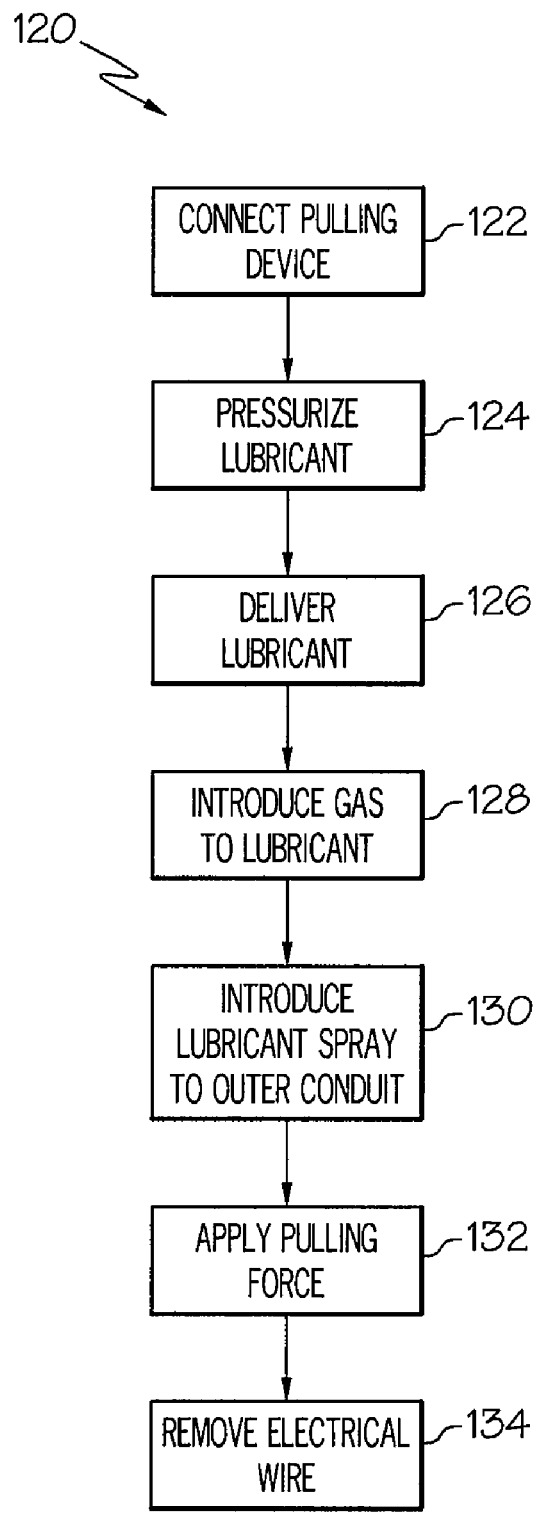
FIG. 5 illustrates an embodiment of a method of pulling electrical wire through an outer conduit.

Referring to FIG. 5, one embodiment of a method of pulling electrical wire through an outer conduit 120 is shown. At step 122, an operator connects one or more of the electrical wires to a wire pulling device. The wire pulling device may be power operated or manually operated. An example of a manually operated device is a lever. The lubricant tank containing liquid wire pulling lubricant is pressurized at step 124 and the wire pulling lubricant is delivered to the atomizing chamber at step 126. At step 128, pressurized air is introduced to the wire pulling lubricant and the wire pulling lubricant is atomized and a lubricant spray is generated. Wire pulling lubricant spray is introduced to an interior of the outer conduit using a lubricant atomizing device at step 130. In some embodiments when removing the electrical wire from the outer conduit, the lubricant spray is introduced to the interior of the outer conduit with the electrical wire in the outer conduit. At step 132, a pulling force is applied to the electrical wire during and/or after the lubricant spray is introduced to the interior of the outer conduit. At step 134, the electrical wire is removed from the outer conduit. In some embodiments, the outer conduit may be about 15 feet long or more, such as about 25 feet or more.

The above-described lubricant atomizing devices 35, 50 and 62 are capable of atomizing wire pulling lubricant to deliver a spray of lubricant to one or more wires and/or to an interior of an outer conduit (see FIG. 1). The lubricant atomizing devices 35, 50 and 62 may have similar or the same features, such as spray characteristics including droplet size, air pressure values, etc. Instead of air, any suitable pressurized gas may be used to atomize the lubricant. In some embodiments, multiple lubricant atomizing devices may be used in the same lubricating system. The lubricant atomizing devices 35, 50 and 62 may be hand-held and portable (i.e., easily carried or conveyed by hand).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of pulling electrical wire through an outer conduit, the method comprising:
    providing an outer conduit having an inner diameter;
    providing a lubricant atomizing device including a lubricant tank and an atomizing chamber;
    pressurizing a wire pulling lubricant within the lubricant tank using a source of pressurized gas external of the lubricant tank;
    delivering the wire pulling lubricant to the atomizing chamber;
    forming a lubricant spray within the atomizing chamber using pressurized gas delivered to the atomizing chamber;
    inserting a lubricant delivery tubing into the outer conduit, the lubricant delivery tubing having an inner diameter that is less than an inner diameter of the outer conduit;
    applying the lubricant spray through the lubricant delivery tubing to an inner surface of the outer conduit; and
    pulling the electrical wire through the outer conduit.

2. The method of claim 1, wherein lubricant delivery tubing is flexible.

3. The method of claim 2, wherein the lubricant delivery tubing has an outer diameter that is less than about 50 percent of an inner diameter of the outer conduit.

4. The method of claim 1, wherein the wire pulling lubricant has a coefficient of friction of about 0.3 or less.

5. The method of claim 1, wherein the step of forming the lubricant spray includes forming droplets having a maximum width of about one millimeter or less.

6. The method of claim 1 comprising delivering pressurized gas to the atomizing chamber at a pressure of about 100 psi or more.

7. The method of claim 1 further comprising delivering the lubricant spray to the inner surface of the outer conduit with the electrical wire located in the outer conduit.

8. The method of claim 7, wherein the step of pulling the electrical wire includes applying a pulling force to the electrical wire during the step of delivering the lubricant spray to the inner surface of the outer conduit.

9. The method of claim 1, wherein the source of pressurized gas is used in both the pressurizing the wire pulling lubricant within the lubricant tank and the forming the lubricant spray of the wire pulling lubricant within the atomizing chamber.

10. A portable hand-held lubricant atomizing device, comprising:
    an inlet for receiving pressurized gas from a pressurized gas source;
    a flow control mechanism associated with the inlet for controlling delivery of the pressurized gas;
    a lubricant tank including a wire pulling lubricant, the lubricant tank being pressurized by the pressurized gas from the pressurized gas source;
    an atomizing chamber in where a lubricant spray is produced using the wire pulling lubricant and pressurized gas; and
    an outlet downstream of the atomizing chamber sized to deliver the lubricant spray to an inner surface of an outer conduit.

11. The portable hand-held lubricant atomizing device of claim 10, wherein the lubricant tank comprises a piston used to dispense the wire pulling lubricant from the lubricant tank.

12. The portable hand-held lubricant atomizing device of claim 11, wherein the piston is moved using pressurized gas from the pressurized gas source.

13. The portable hand-held lubricant atomizing device of claim 12, wherein the flow control mechanism controls delivery of pressurized gas to both the lubricant tank and the atomizing chamber.

14. The portable hand-held lubricant atomizing device of claim 10, wherein the wire pulling lubricant has a coefficient of friction of about 0.3 or less.

15. The portable hand-held lubricant atomizing device of claim 10, wherein the pressurized gas source provides gas at a pressure of about 100 psi or more.

16. A lubricant system, comprising:
a wire pulling device configured to apply a pulling force to an electrical wire for pulling the electrical wire through an outer conduit;
a portable hand-held lubricant atomizing device comprising:
a lubricant tank including a wire pulling lubricant;
an lubricant delivery member where a lubricant spray of the wire pulling lubricant is produced; and
a flow control mechanism that controls delivery of a pressurized gas from a pressurized gas source to both the lubricant tank and the lubricant delivery member for generating the lubricant spray.

17. The lubricant system of claim 16 further comprising a pressurized gas source configured to provide a pressurized gas at about 100 psi or more.

18. The lubricant system of claim 16, wherein the lubricant delivery member includes:
a first chamber that receives the wire pulling lubricant from the lubricant tank and pressurized gas from the flow control mechanism;
an expansion chamber; and
a flow restriction providing communication between the first chamber and the expansion chamber.

19. The lubricant system of claim 18 further comprising a flexible lubricant delivery tubing in communication with the expansion chamber to deliver the lubricant spray to an inner surface of the outer conduit.

20. The lubricant system of claim 19 further comprising a flow control valve configured to release pressure in the lubricant tank.

\* \* \* \* \*